US010693561B2

(12) United States Patent
Lim et al.

(10) Patent No.: US 10,693,561 B2
(45) Date of Patent: Jun. 23, 2020

(54) APPARATUS AND METHOD FOR BEAMFORMING COMMUNICATION

(71) Applicant: Electronics and Telecommunications Research Institute, Daejeon (KR)

(72) Inventors: Kwon Seob Lim, Daejeon (KR); Hyun Seo Kang, Gwangju (KR); Dae Seon Kim, Gwangju (KR); Sang Jin Kwon, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/547,999

(22) Filed: Aug. 22, 2019

(65) Prior Publication Data

US 2020/0076511 A1 Mar. 5, 2020

(30) Foreign Application Priority Data

Sep. 3, 2018 (KR) .................. 10-2018-0104759

(51) Int. Cl.
*H04B 10/00* (2013.01)
*H04B 10/532* (2013.01)
(Continued)

(52) U.S. Cl.
CPC ....... *H04B 10/532* (2013.01); *H04B 10/2504* (2013.01); *H04B 10/564* (2013.01); *H04B 10/6162* (2013.01); *H04B 10/6164* (2013.01); *H04B 10/6166* (2013.01); *H04J 14/06* (2013.01)

(58) Field of Classification Search
CPC .................. H04B 10/2575; H01Q 3/2676
See application file for complete search history.

(56) References Cited

U.S. PATENT DOCUMENTS 8,934,774 B2   1/2015 Yi et al.
10,224,628 B2  3/2019 Drummond et al.
(Continued)

FOREIGN PATENT DOCUMENTS

CN   103532604 A   1/2014
CN   103532604 B   3/2016
(Continued)

*Primary Examiner* — Daniel G Dobson
(74) *Attorney, Agent, or Firm* — William Park & Associates Ltd.

(57) ABSTRACT

A transmitting apparatus includes an optical modulator configured to modulate input light from a light source into a light signal including a carrier signal and a sideband signal based on a radio frequency (RF) signal, having polarization characteristics crossing each other, an optical power splitter configured to split the light signal into a plurality of light signals, a plurality of light phase shifters configured to respectively shift phases of the plurality of light signals, a plurality of polarization controllers configured to perform control so that a carrier signal and a sideband signal included in each of the phase-shifted plurality of light signals have the same polarization characteristic, and a plurality of photodetectors configured to convert the plurality of light signals, having polarization characteristics controlled by the plurality of polarization controllers, into a plurality of electrical signals and to transfer the electrical signals to a plurality of antenna elements.

20 Claims, 11 Drawing Sheets

(51) Int. Cl.
    *H04J 14/06*     (2006.01)
    *H04B 10/61*     (2013.01)
    *H04B 10/25*     (2013.01)
    *H04B 10/564*     (2013.01)
    *H04J 14/00*     (2006.01)

(56) References Cited

U.S. PATENT DOCUMENTS

| | | |
|---|---|---|
| 2012/0328298 A1 | 12/2012 | Yi et al. |
| 2013/0169483 A1 * | 7/2013 | Vidal Drummond ........................ H04B 10/25752 342/375 |
| 2016/0191133 A1 | 6/2016 | Noh et al. |
| 2016/0371515 A1 | 12/2016 | Jung et al. |
| 2017/0201303 A9 | 7/2017 | Noh et al. |
| 2017/0310006 A1 | 10/2017 | Drummond et al. |

FOREIGN PATENT DOCUMENTS

| | | |
|---|---|---|
| CN | 107078810 A | 8/2017 |
| EP | 0623969 A2 | 11/1994 |
| EP | 0623969 B1 | 6/2001 |
| KR | 1020060108178 A | 10/2006 |
| KR | 100711843 B1 | 4/2007 |

\* cited by examiner

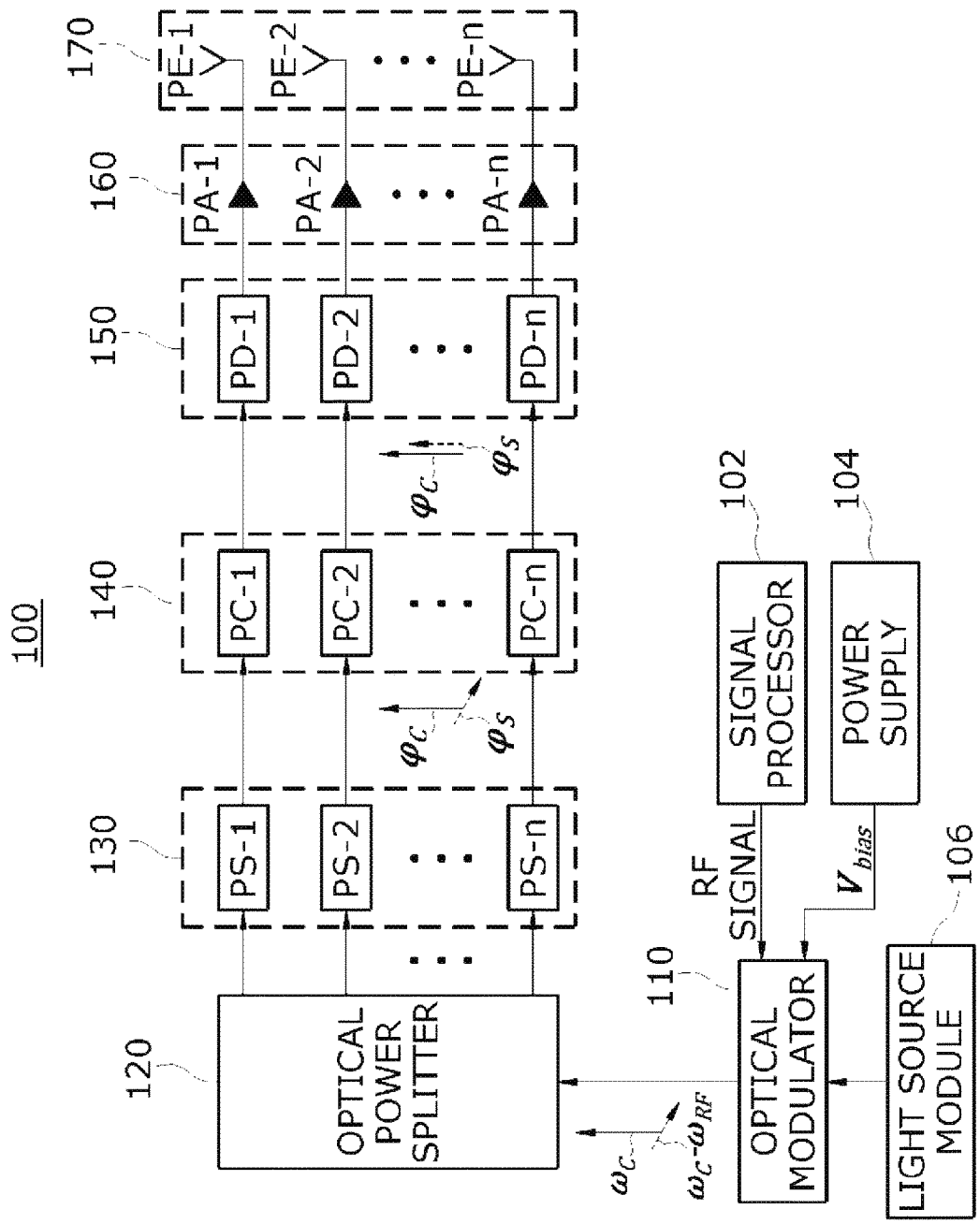

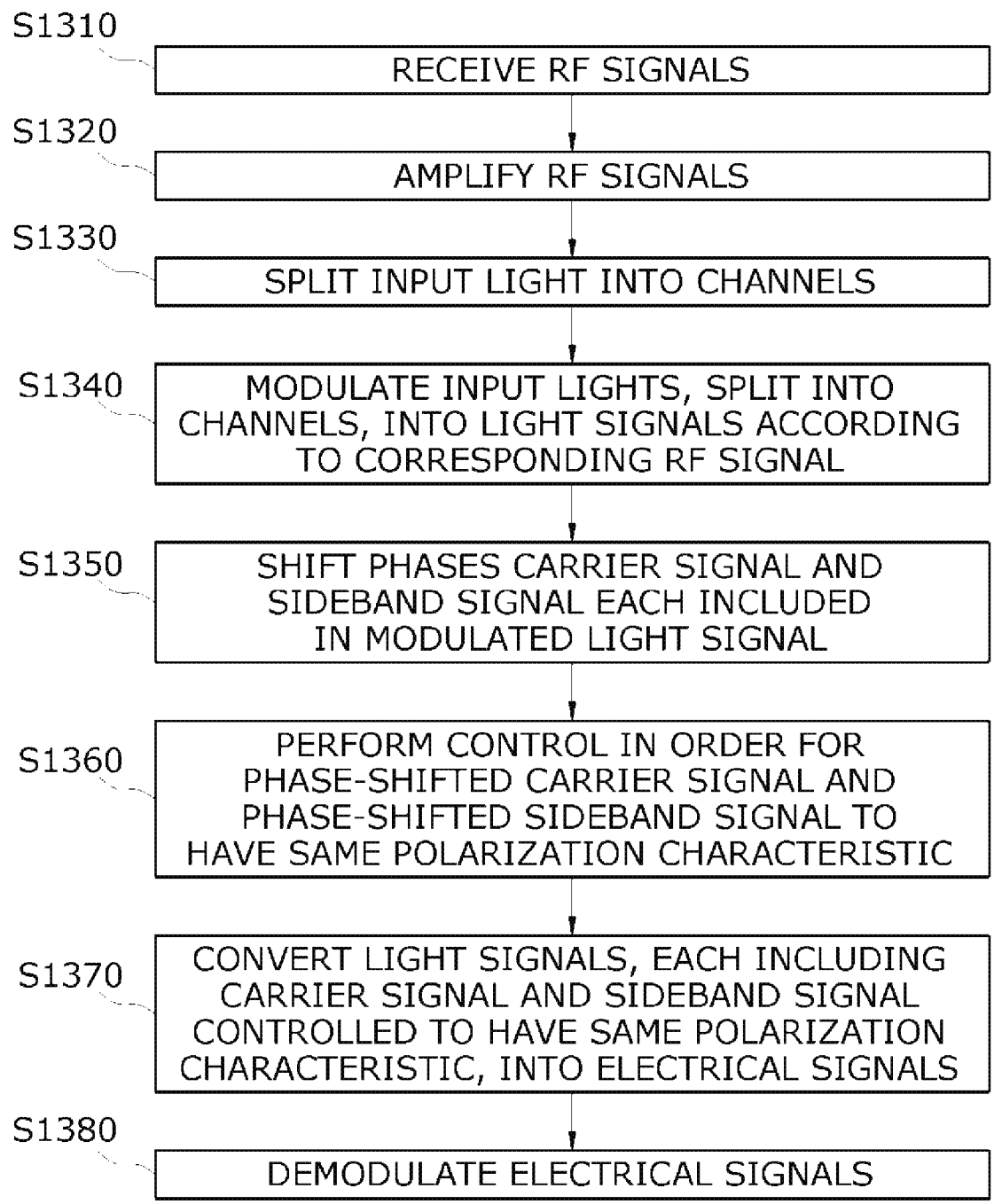

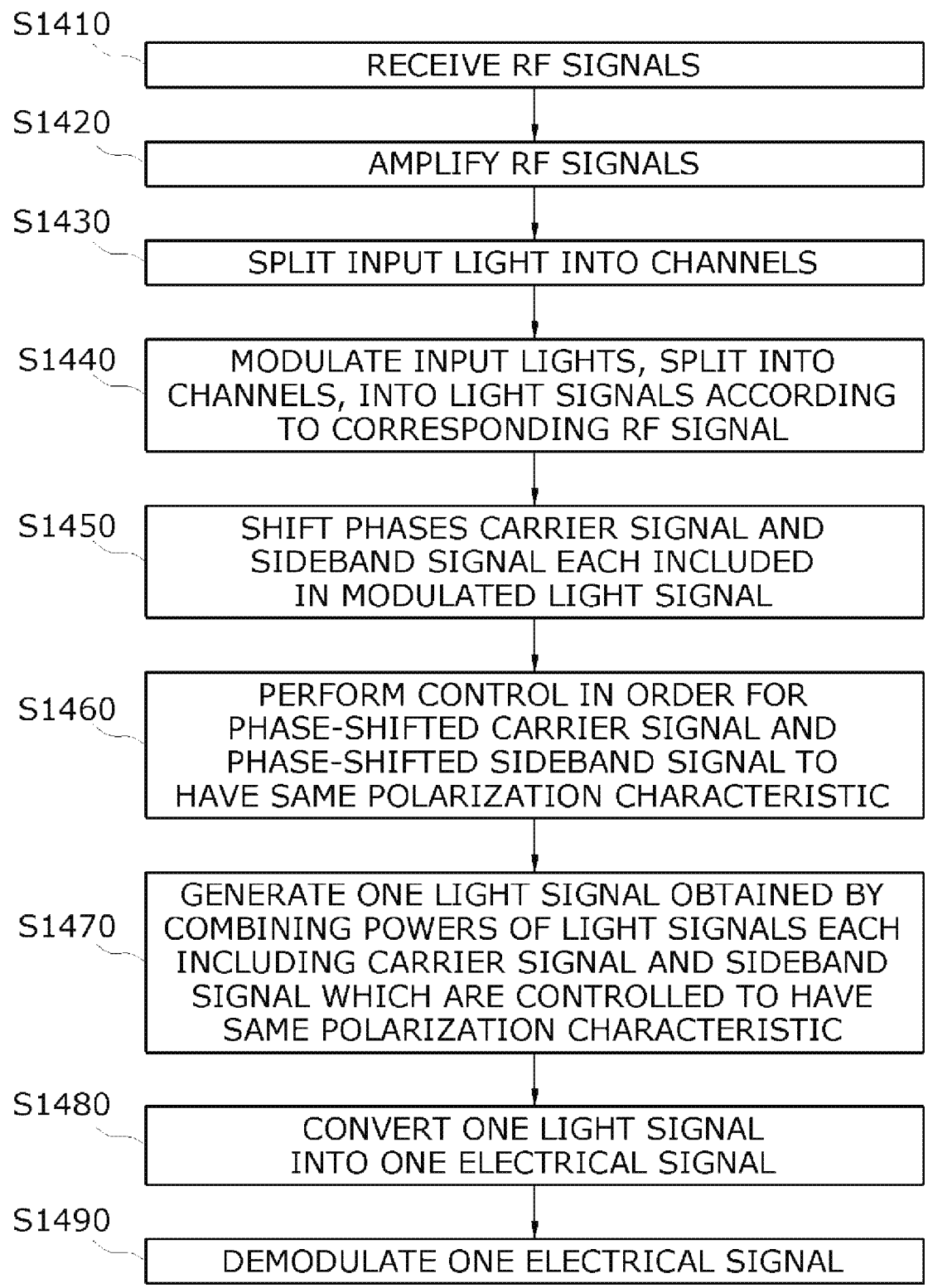

APPARATUS AND METHOD FOR BEAMFORMING COMMUNICATION

CROSS-REFERENCE TO RELATED APPLICATIONS

This application claims priority under 35 U.S.C. § 119 to Korean Patent Application No. 10-2018-0104759, filed on Sep. 3, 2018, the disclosure of which is incorporated herein by reference in its entirety.

TECHNICAL FIELD

The present invention relates to beamforming technology using a phase shift in a wideband wireless communication system.

BACKGROUND

A related art phase array antenna uses an electrical microwave phase shifter for steering beam in a desired direction, and in this case, there is a beam squint problem where the phase array antenna is usable in only a narrowband due to a phase error caused by a frequency of a phase shifter.

In phase array antennas, it is required to develop beamforming technology for causing a desired phase shift regardless of a frequency of a radio frequency (RF) signal in order for the phase array antennas to be used even when the frequency of the RF signal varies rapidly or transmission of a wideband signal is needed.

SUMMARY

Accordingly, the present invention provides a beamforming apparatus for causing a desired phase shift regardless of a carrier frequency which is to be transmitted or received.

In one general aspect, a transmitting apparatus for beamforming communication, including elements manufactured in a wafer level through a silicon or compound-based photonics process, includes: an optical modulator configured to modulate polarized or unpolarized input light into a light signal including a carrier signal and a sideband signal based on a radio frequency (RF) signal, having polarization characteristics crossing each other; an optical power splitter configured to split the light signal into a plurality of light signals obtained by splitting power at an arbitrary splitting rate; a plurality of light phase shifters configured to respectively shift phases of the plurality of light signals; a plurality of polarization controllers configured to perform control so that a phase-shifted carrier signal and a phase-shifted sideband signal included in each of the phase-shifted plurality of light signals have the same polarization characteristic; a plurality of photodetectors configured to convert the plurality of light signals, each including the phase-shifted carrier signal and the phase-shifted sideband signal which are controlled to have the same polarization characteristic, into a plurality of electrical signals; and a plurality of antenna elements configured to radially transmit the plurality of electrical signals in an RF signal form, respectively.

In another general aspect, a receiving apparatus for beamforming communication includes: an optical power splitter configured to split polarized or unpolarized input light into a plurality of polarized or unpolarized input lights each obtained by splitting power at an arbitrary splitting rate; a plurality of optical modulators respectively connected to a plurality of antenna elements and configured to modulate corresponding input light of the plurality of polarized or unpolarized input lights into a light signal including a carrier signal and a sideband signal based on a radio frequency (RF) signal received through a corresponding antenna element of the plurality of antenna elements, the carrier signal and the sideband signal having polarization characteristics crossing each other; a plurality of light phase shifters configured to respectively shift phases of a plurality of modulated light signals; a plurality of polarization controllers configured to perform control so that a carrier signal and a sideband signal included in each of a plurality of phase-shifted light signals have the same polarization characteristic; a plurality of photodetectors configured to convert a plurality of light signals, having polarization characteristics controlled by the plurality of polarization controllers, into a plurality of electrical signals; and a signal processor configured to demodulate the plurality of electrical signals.

In another general aspect, a transmitting method for beamforming communication includes: modulating, by an optical modulator, polarized or unpolarized input light into a light signal including a carrier signal and a sideband signal based on a radio frequency (RF) signal, having polarization characteristics crossing each other; splitting, by an optical power splitter, the light signal into a plurality of light signals; respectively shifting, by a plurality of light phase shifters, phases of the plurality of light signals; performing, by a plurality of polarization controllers, control so that a phase-shifted carrier signal and a phase-shifted sideband signal included in each of the plurality of light signals have the same polarization characteristic; converting, by a plurality of photodetectors, the plurality of light signals, each including the phase-shifted carrier signal and the phase-shifted sideband signal which are controlled to have the same polarization characteristic, into a plurality of electrical signals; and radially transmitting, by a plurality of antenna elements, the plurality of electrical signals in an RF signal form.

Other features and aspects will be apparent from the following detailed description, the drawings, and the claims.

BRIEF DESCRIPTION OF THE DRAWINGS

FIG. 1 is a block diagram of a transmitting apparatus included in a beamforming apparatus according to an embodiment of the present invention.

FIG. 13 is a flowchart illustrating a receiving method in a beamforming apparatus according to an embodiment of the present invention.

FIG. 14 is a flowchart illustrating a receiving method in a receiving apparatus according to another embodiment of the present invention.

DETAILED DESCRIPTION OF EMBODIMENTS

Figure 2A:
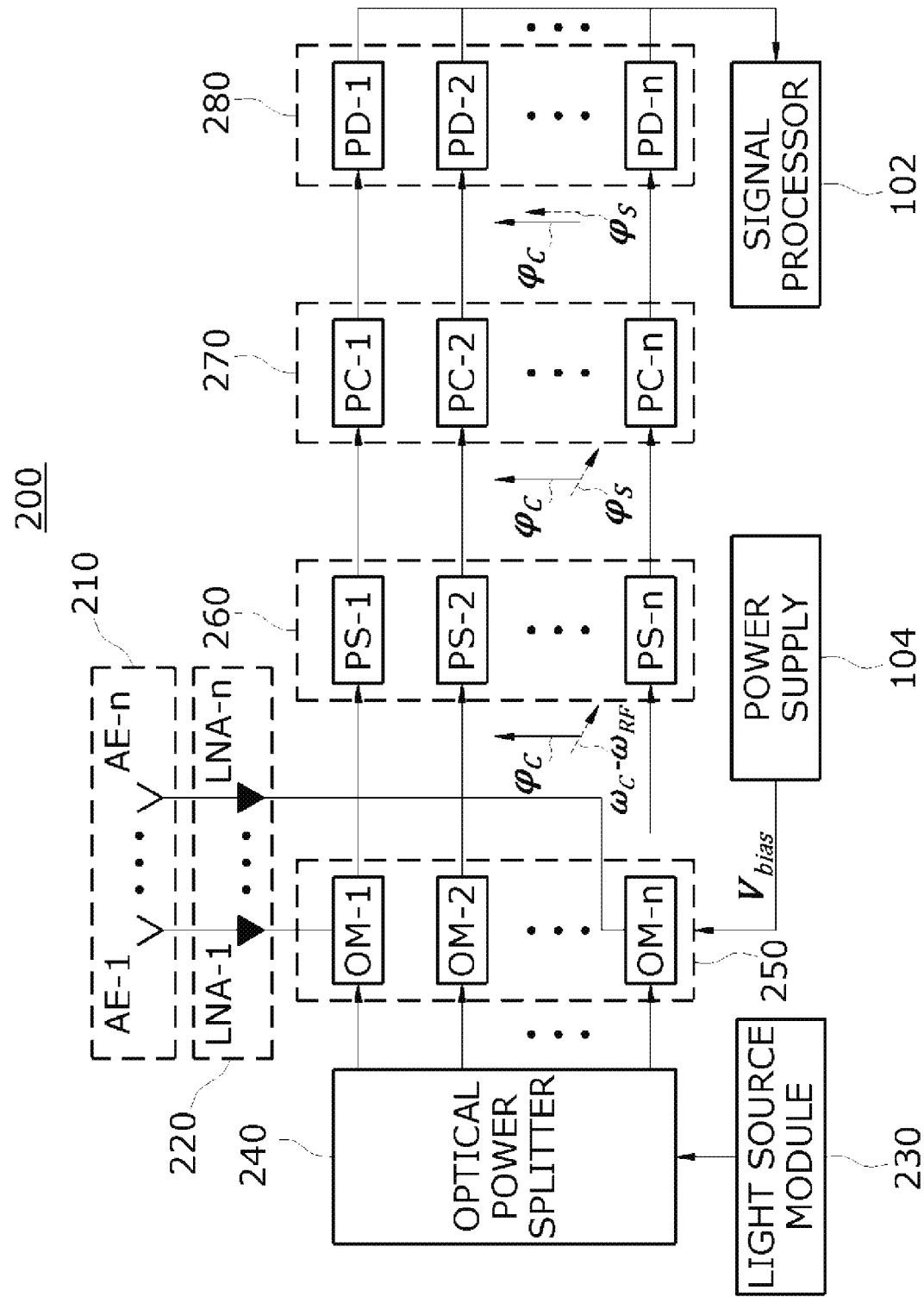
FIGS. 2A and 2B are block diagrams of a receiving apparatus in a beamforming apparatus according to an embodiment of the present invention.

Hereinafter, example embodiments of the present invention will be described in detail with reference to the accompanying drawings. Embodiments of the present invention are provided so that this disclosure will be thorough and complete, and will fully convey the concept of the present invention to one of ordinary skill in the art. Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In various embodiments of the disclosure, the meaning of 'comprise', 'include', or 'have' specifies a property, a region, a fixed number, a step, a process, an element and/or a component but does not exclude other properties, regions, fixed numbers, steps, processes, elements and/or components.

As used herein, the term "or" includes any and all combinations of one or more of the associated listed items. For example, "A or B" may include A, include B, or include A and B.

It will be understood that, although the terms first, second, etc. used herein may qualify various elements according to various embodiments, these elements should not be limited by these terms. For example, the terms do not limit the order and/or importance of corresponding elements. These terms are only used to distinguish one element from another. For example, a first user equipment and a second user equipment are user equipment and denote different user equipment. For example, a first element may be referred to as a second element without departing from the spirit and scope of the present invention, and similarly, the second element may also be referred to as the first element.

In the case in which a component is referred to as being "connected" or "accessed" to other component, it should be understood that not only the component is directly connected or accessed to the other component, but also there may exist another component between the components. Meanwhile, in the case in which a component is referred to as being "directly connected" or "directly accessed" to other component, it should be understood that there is no component therebetween.

In the following description, the technical terms are used only for explain a specific embodiment while not limiting the present invention. The terms of a singular form may include plural forms unless referred to the contrary.

Unless otherwise defined, all terms (including technical and scientific terms) used herein have the same meaning as commonly understood by one of ordinary skill in the art to which example embodiments belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a transmitting apparatus 100 for beamforming communication according to an embodiment of the present invention.

Referring to FIG. 1, the transmitting apparatus 100 included in a beamforming apparatus according to an embodiment of the present invention may include a signal processor 102, a power supply 104, a light source module 106, an optical modulator 110, an optical power splitter 120, a light phase shift block 130, a polarization control block 140, a light detection block 150, an amplifier block 160, and a phase array antenna 170.

The signal processor 102 may generate a radio frequency (RF) signal which is to be transmitted to a receiving apparatus, and may output the generated RF signal to the optical modulator 110.

The power generator 104 may generate a bias voltage $V_{bias}$ for driving the optical modulator 110 and may output the bias voltage $V_{bias}$ to the optical modulator 110.

The light source module 106 may include a light source which modulates the RF signal into a light signal, based on an optical modulation manner. The light source may provide polarized input light and/or unpolarized input light. The light source may include a light emitting diode (LED), an organic LED (OLED), and a laser diode (LD).

The optical modulator 110 may modulate an intensity, a phase, or a frequency of the polarized or unpolarized input light output from the light source module 106 on the basis of the RF signal output from the signal processor 102 to output a light signal. The optical modulator 110 may be driven with the bias voltage $V_{bias}$ applied to the power supply 104 and may modulate the polarized or unpolarized input light into a light signal which includes a carrier signal and a sideband signal of the RF signal, having polarization characteristics crossing each other.

In FIG. 1, $\omega_c$ may denote a carrier frequency for a carrier signal of the light source, $\omega_c-\omega_{RF}$ may be denote a frequency of a sideband signal, and $\omega_{RF}$ may be denote a frequency of the RF signal. In the present specification, for convenience of description, $\omega_c$ may be used as a symbol representing the carrier signal of the light source or the carrier frequency for the carrier signal of the light source, and $\omega_c-\omega_{RF}$ may be used as a symbol representing the sideband signal or a frequency of the sideband signal.

For reference, the sideband signal may be one of signals which appear in a left side and a right side with respect to a carrier frequency, and information included in the RF signal may be added to the sideband signal. Sideband signals appearing in the left side and the right side may be referred to as a double sideband (DSB) signal, and a sideband signal appearing in one the left side and the right side may be referred to as a single sideband (SSB) signal.

A sideband signal included in the light signal obtained through modulation by the optical modulator 110 may be assumed as an SSB signal "$\omega_c-\omega_{RF}$" appearing in a left side with respect to a carrier frequency "$\omega_c$", but may be an SSB signal "$\omega_c+\omega_{RF}$" appearing in a right side with respect to the carrier frequency "$\omega_c$".

The optical power splitter 120 may split the light signal, input from the optical modulator 110, into n (where n is a natural number equal to or more than two) number of channels. To this end, the optical power splitter 120 may include one input port and n number of output ports, and powers of light signals obtained through channel-based splitting may be determined based on a predetermined rate.

The light phase shift block 130 may include n number of light phase shifters PS-1 to PS-n arranged in parallel. The n light phase shifters PS-1 to PS-n may respectively receive the n light signals obtained through splitting by the optical power splitter 120.

Each of the light phase shifters PS-1 to PS-n may shift a phase of a corresponding light signal, based on a predetermined phase shift rate. That is, each of the light phase shifters PS-1 to PS-n may shift a phase of a carrier signal "$\omega_c$", included in a light signal received through a corresponding channel, to a phase "$\varphi_c$" on the basis of the predetermined phase shift rate and may shift a phase of a sideband signal "$\omega_c-\omega_{RF}$" of the RF signal to a phase "$\varphi_S$" on the basis of the predetermined phase shift rate. Hereinafter, in order to help understand description, $\varphi_c$ may be used as a reference symbol representing a phase-shifted carrier signal, and $\varphi_S$ may be used as a reference symbol representing a phase-shifted sideband signal.

The polarization control block 140 may include n number of polarization controllers PC-1 to PC-n arranged in parallel. The n polarization controllers PC-1 to PC-n may be respectively connected to the n light phase shifters PS-1 to PS-n. Each of the n polarization controllers PC-1 to PC-n may receive a light signal, including a carrier signal "$\varphi_c$" and a sideband signal "$\varphi_S$" having polarization characteristics crossing each other, from a corresponding light phase shifter and may control a polarization characteristic of the light signal in order for the carrier signal "$\varphi_c$" and the sideband signal "$\varphi_S$" to have the same polarization characteristic.

To this end, each of the n polarization controllers PC-1 to PC-n may separate the carrier signal "$\varphi_c$" and the sideband signal "$\varphi_S$" on the basis of a polarization characteristic, perform control in order for the carrier signal "$\varphi_c$" and the sideband signal "$\varphi_S$" to have the same polarization by rotating, by 90 degrees, polarization of one of the carrier signal "$\varphi_c$" and the sideband signal "$\varphi_S$", and combine a carrier signal and a sideband signal which are obtained to have the same polarization characteristic through conversion. However, the present embodiment is not limited thereto. In the present specification, it may be assumed that polarization of the RF signal and polarization of the sideband signal "$\varphi_S$" rotate by 90 degrees.

In FIG. 1, a solid-line arrow indicated by $\omega_c$ and $\varphi_c$ may represent a polarization direction of a carrier signal, and a dotted-line arrow indicated by $\omega_c-\omega_{RF}$ and $\varphi_S$ may represent a polarization direction of a sideband signal crossing the carrier signal. A variation of a polarization characteristic (i.e., a rotation of polarization) may be illustrated as changing of an arrow direction as illustrated in FIG. 1.

The light detection block 150 may include n number of photodetectors PD-1 to PD-n arranged in parallel. The n photodetectors PD-1 to PD-n may be respectively connected to n number of polarization combiners. Therefore, each of the photodetectors may receive a light signal, obtained by combining a carrier signal and a sideband signal having the same polarization characteristic, from a corresponding polarization combiner. Each of the n photodetectors PD-1 to PD-n may convert the received light signal into an electrical signal and may transfer the electrical signal to the amplifier block 160.

The amplifier block 160 may include n number of power amplifiers PA-1 to PA-n. The n power amplifiers PA-1 to PA-n may be respectively connected to the n photodetectors PD-1 to PD-n. Each of the n power amplifiers PA-1 to PA-n may receive an electrical signal, obtained by converting a light signal, from a corresponding photodetector and may amplify the electrical signal to transfer an amplified electrical signal to the phase array antenna 170.

The phase array antenna 170 may include n number of antenna elements AE-1 to AE-n, for obtaining a desired antenna characteristic. The n antenna elements AE-1 to AE-n may be respectively connected to the n power amplifiers PA-1 to PA-n. Each of the n antenna elements AE-1 to AE-n may receive an amplified electrical signal from a corresponding power amplifier and may radially transmit the received electrical signal in an RF signal form. That is, the phase array antenna 170 including the n antenna elements AE-1 to AE-n may radially transmit a plurality of RF signals.

In this manner, a light phase shifter may differently shift phases of two signals (a carrier signal and a sideband signal of an RF signal) for each channel, a polarization combiner may combine two phase-shifted signals (a phase-shifted carrier signal and a phase-shifted sideband signal of the RF signal) to the same polarization, and a photodetector may finally convert two signals (a carrier signal and a sideband signal of an RF signal), combined to the same polarization, into electrical signals. In such a process, beating of two signals may be performed, and thus, a phase of a final RF signal may be shifted by a phase difference between the two signals, whereby the phase array antenna may implement beamforming having directionality at a desired irradiation angle.

FIG. 2A is a block diagram of a receiving apparatus 200 in a beamforming apparatus according to an embodiment of the present invention.

Referring to FIG. 2A, the receiving apparatus 200 in the beamforming apparatus according to an embodiment of the present invention may include a phase array antenna 210, an amplifier block 220, a light source module 230, an optical power splitter 240, an optical modulator block 250, a light phase shift block 260, a polarization control block 270, and a light detection block 280.

The phase array antenna 210 may include a plurality of antenna elements AE-1 to AE-n which receive a plurality of RF signals.

The amplifier block 220 may include n number of low noise amplifiers LNA-1 to LNA-n respectively connected to the antenna elements AE-1 to AE-n. Each of the low noise amplifiers LNA-1 to LNA-n may decrease a noise component included in an RF signal received through a corresponding antenna element and may amplify a signal component included in the received RF signal.

The light source module 230 may be the same element as the light source module 106 illustrated in FIG. 1, and except for that the light source module 230 outputs polarized or unpolarized input light to the optical power splitter 240, the light source module 230 may have the same configuration and function as those of the light source module 106 illustrated in FIG. 1. Therefore, a detailed description of the light source module 106 may be applied to the light source module 230.

The optical power splitter 240 may be substantially the same as the optical power splitter 120 illustrated in FIG. 1, and may have a difference with the optical power splitter 120 of FIG. 1 in that polarized or unpolarized input light output from the light source module 230 is split into n number of channels. Therefore, a detailed description of the optical power splitter 120 may be applied to the optical power splitter 240.

The optical modulator block 250 may modulate n number of input lights, obtained through splitting by the optical power splitter 240, into n number of light signals on the basis of a plurality of RF signals amplified by the low noise amplifiers LNA-1 to LNA-n. To this end, the optical modulator block 250 may include n number of optical modulators OM-1 to OM-n arranged in parallel. The n optical modulators OM-1 to OM-n may receive, through the n channels, the n input lights obtained through splitting by the optical power splitter 240. When a bias voltage $V_{bias}$ is applied from the power supply 104, each of the n optical modulators OM-1 to OM-n may modulate input light into a light signal which includes a carrier signal and a sideband signal of a corresponding RF signal, based on the bias voltage $V_{bias}$ and the corresponding RF signal output from a corresponding low noise amplifier.

The light phase shift block 260 may include n number of light phase shifters PS-1 to PS-n arranged in parallel. The n light phase shifters PS-1 to PS-n may be respectively connected to the n optical modulators OM-1 to OM-n. Each of the n light phase shifters PS-1 to PS-n may receive a light signal obtained through modulation by a corresponding optical modulator and may shift a phase of the received light signal. That is, each of the n light phase shifters PS-1 to PS-n may shift a phase of a carrier signal, included in the light signal, to a specific phase "$\varphi_c$" on the basis of a phase shift rate which is differently set for each channel, and may shift a phase of the sideband signal of the corresponding RF signal to the specific phase "$\varphi_S$".

Except for that the polarization control block 270 is included in the receiving apparatus, the polarization control block 270 may have substantially the same configuration and function as those of the polarization control block 140 illustrated in FIG. 1. Therefore, a detailed description of the polarization control block 140 illustrated in FIG. 1 may be applied to the polarization control block 270.

The light detection block 280 may be substantially the same element as the light detection block 150 illustrated in FIG. 1. However, the light detection block 280 may have a difference with the light detection block 150 of FIG. 1 in that electrical signals detected by the light detection block 280 are transmitted to the signal processor 102 so as to be demodulated. Therefore, a detailed description of the light detection block 150 may be applied to the light detection block 280.

Figure 2B:
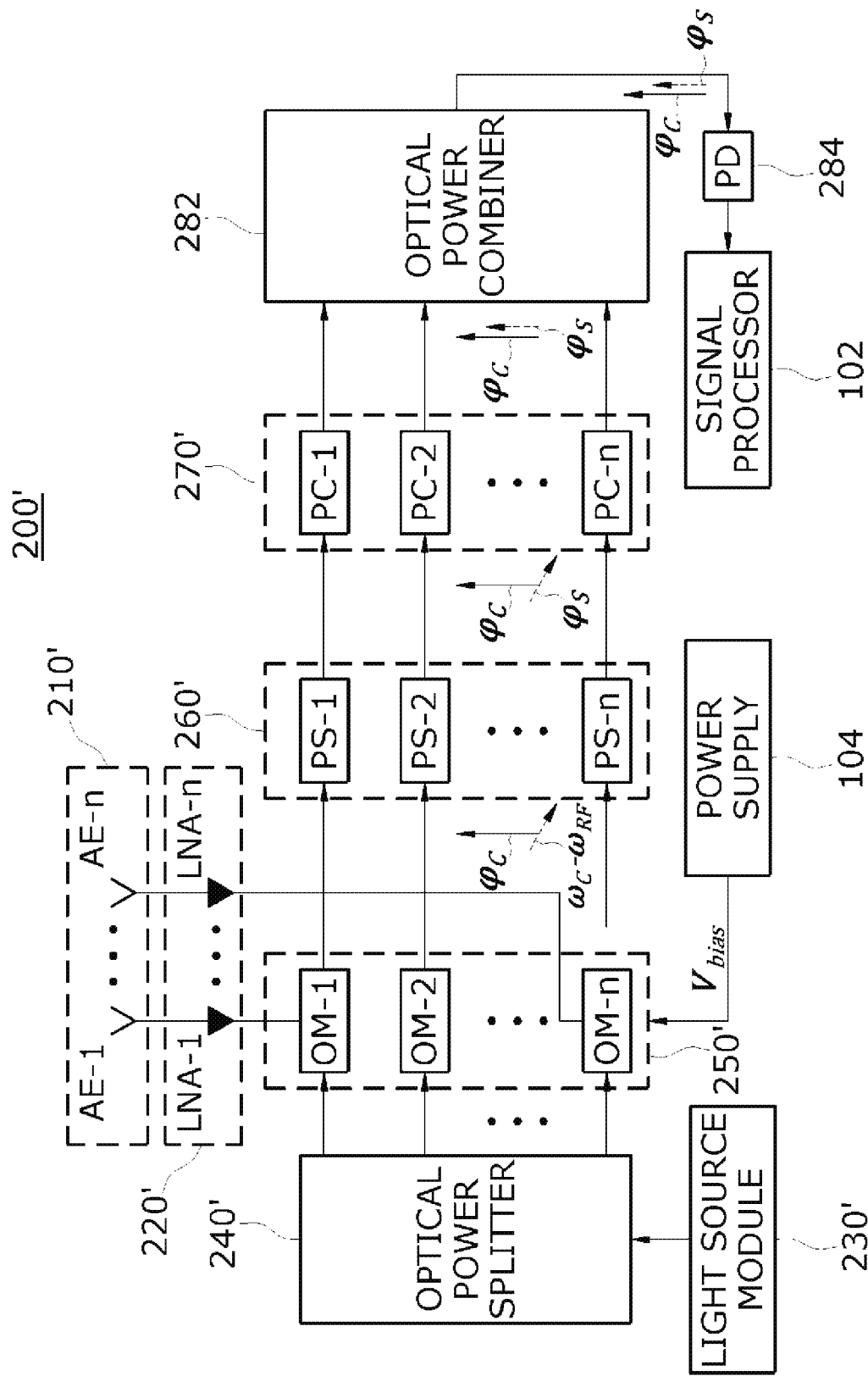

FIG. 2B is a block diagram of a receiving apparatus 200' for beamforming communication according to another embodiment of the present invention.

Referring to FIG. 2B, the receiving apparatus 200' according to another embodiment of the present invention may include a phase array antenna 210', an amplifier block 220', a light source module 230', an optical power splitter 240', an optical modulator block 250', a light phase shift block 260', a polarization control block 270', an optical power combiner 282, and a photodetector 284.

The phase array antenna 210', the amplifier block 220', the light source module 230', the optical power splitter 240', the optical modulator block 250', the light phase shift block 260', and the polarization control block 270' may be respectively the same elements as the phase array antenna 210, the amplifier block 220, the light source module 230, the optical power splitter 240, the optical modulator block 250, the light phase shift block 260, and the polarization control block 270 illustrated in FIG. 2A. Therefore, descriptions of the elements of FIG. 2A may be applied to the elements of FIG. 2B.

The optical power combiner 282 may combine powers of n light signals output from polarization controllers of the polarization control block 270' to output one light signal.

The photodetector 283 may convert the light signal, output from the optical power combiner 282, into an electrical signal and may output the electrical signal to the signal processor 102. Except for that the photodetector 284 is configured with one photodetector unlike the plurality of photodetectors PD-1 to PD-n of FIG. 2A, the photodetector 294 may have the same configuration and function as those of each of the photodetectors PD-1 to PD-n. Therefore, a description of each of the photodetectors PD-1 to PD-n may be applied to the photodetector 284.

Figure 3:
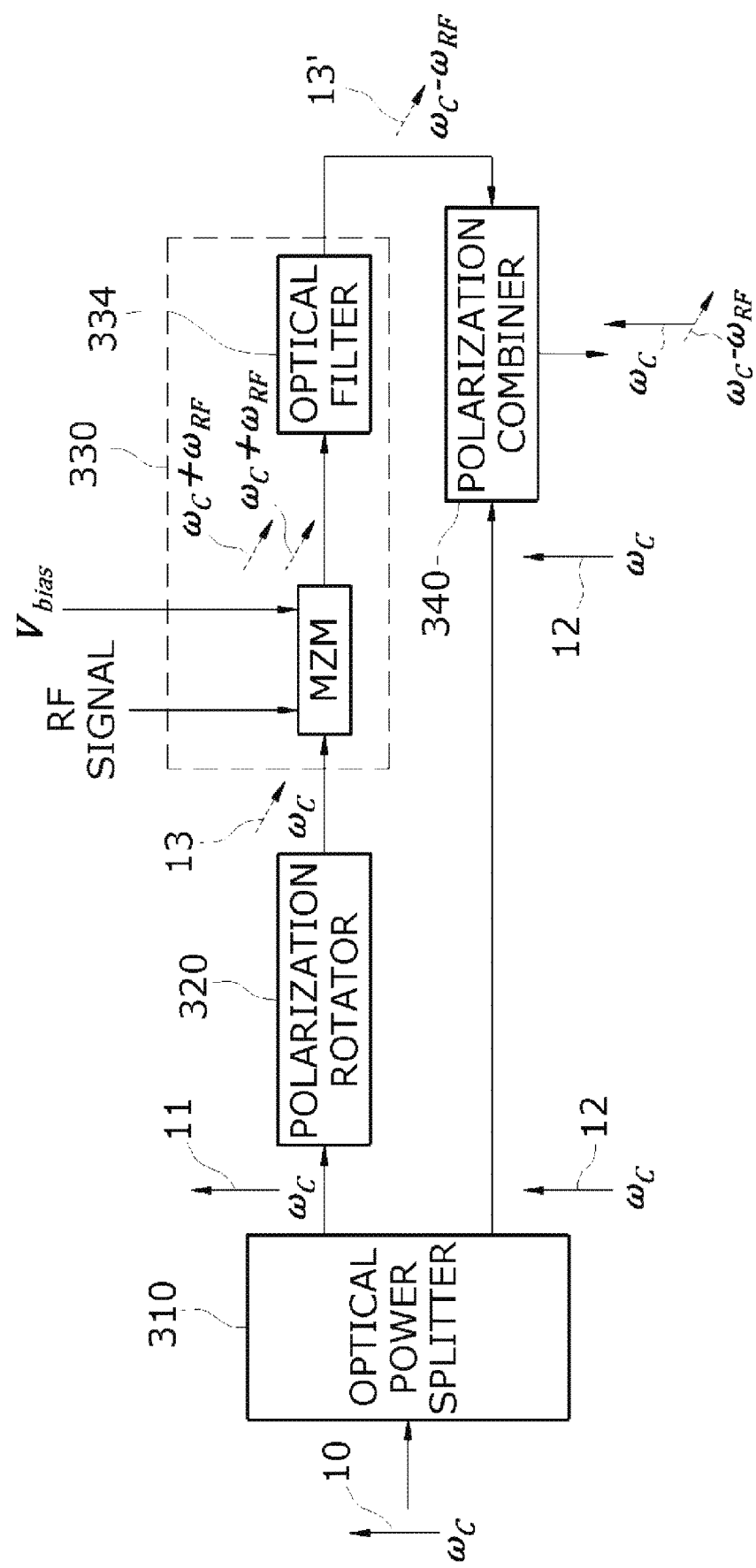
FIG. 3 is a block diagram illustrating an example of an optical modulator illustrated in FIGS. 1, 2A, and 2B.

FIG. 3 is a block diagram of one optical modulator illustrated in FIGS. 1, 2A, and 2B.

Referring to FIG. 3, an optical modulator may include an optical power splitter 310, a polarization rotator 320, an SSB signal generator 330, and a polarization combiner 340.

The optical power splitter 310 may split polarized input light into a first light signal 11 and a second light signal 12, which are obtained by splitting power at a predetermined splitting rate.

The polarization rotator 320 may rotate, by 90 degrees, polarization of one of the first light signal 11 and the second light signal 12. In the present specification, for convenience of description, an example where the polarization rotator 320 rotates polarization of the first light signal 11 is described. However, the polarization rotator 320 may rotate polarization of the second light signal 12.

The polarization rotator 320 may rotate the polarization of the first light signal 11 by 90 degrees with respect to the second light signal 12 to control polarization in order for polarization characteristics of the first and second light signals 11 and 12 to cross each other.

The SSB signal generator 330 may modulate a light signal 13 of which polarization has rotated by 90 degrees, based on an RF signal which is to be transmitted or a received RF signal, thereby generating one sideband signal "$\omega_c - \omega_{RF}$". To this end, the SSB signal generator 330 may include a Mach-Zander modulator (MZM) 332 and an optical filter 334. When a bias voltage $V_{bias}$ is input, the MZM 332 may modulate the light signal 13 into two sideband signals "$\omega_c + \omega_{RF}$" and "$\omega_c - \omega_{RF}$", based on an RF signal which is to be transmitted or a received RF signal. The optical filter 334 may remove one sideband signal from among the two sideband signals "$\omega_c + \omega_{RF}$" and "$\omega_c - \omega_{RF}$". In the present specification, it may be assumed that the optical filter 334 removes a right sideband signal "$\omega_c + \omega_{RF}$" with respect to a carrier frequency "$\omega_c$" and outputs a left sideband signal "$\omega_c - \omega_{RF}$". The MZM 332 and the optical filter 334 may be implemented as integrated photonics devices which are embedded into one chip through a silicon-based photonics process or compound-based photonics process.

The polarization combiner 340 may combine polarization of the second light signal 12 input from the optical power splitter 310 with polarization of the sideband signal $\omega_c - \omega_{RF}$ filtered by the optical filter 340. Therefore, the polarization combiner 340 may output a light signal which is obtained by combining polarization of a carrier signal "$\omega_c$" and polarization of a sideband signal "$\omega_c - \omega_{RF}$" of an RF signal having polarization characteristics crossing each other. The polarization combiner 340 may be implemented with integrated photonics devices which are embedded into one chip through a silicon or compound-based photonics process.

The optical power splitter 310, the polarization rotator 320, the SSB signal generator 330, and the polarization combiner 340 may be implemented as integrated photonics devices which are embedded into one chip through a silicon or compound-based photonics process.

Figure 4:
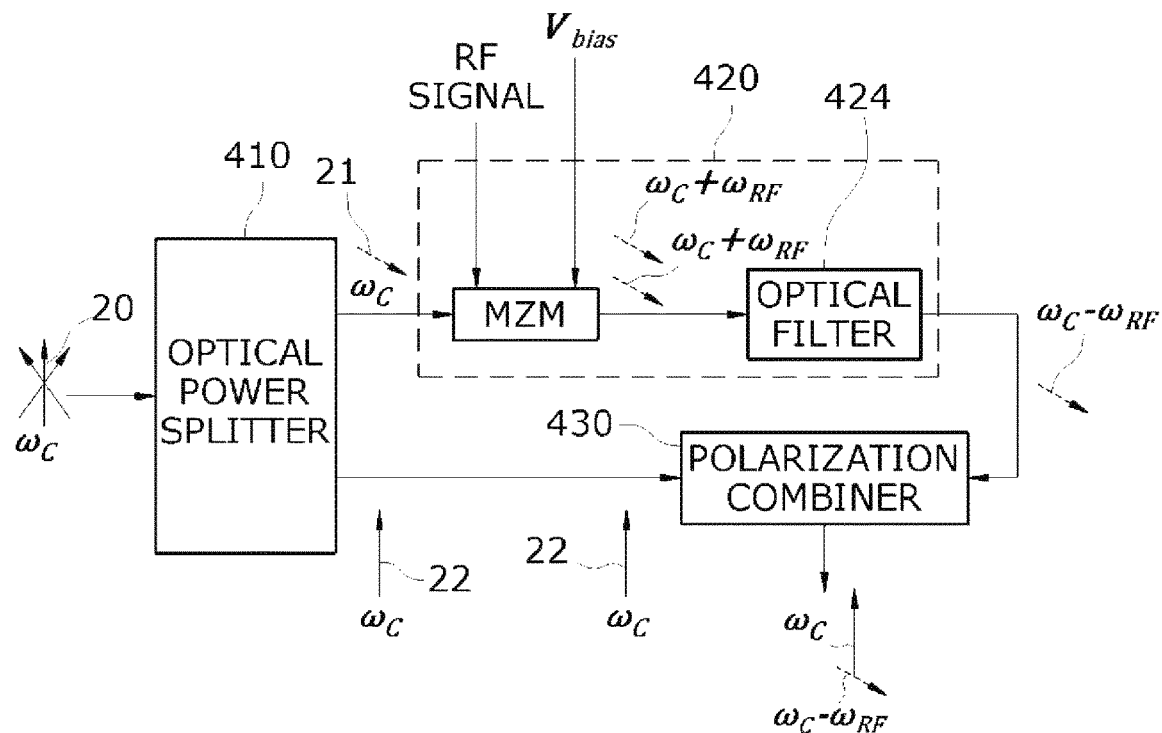
FIG. 4 is a block diagram illustrating another example of an optical modulator illustrated in FIGS. 1, 2A, and 2B.

FIG. 4 is a block diagram illustrating another example of an optical modulator illustrated in FIGS. 1, 2A, and 2B.

Referring to FIG. 4, an optical modulator according to another embodiment of the present invention may have a difference with the optical modulator of FIG. 3 in that unpolarized input light (or natural light) instead of polarized input light is modulated.

The optical modulator according to another embodiment of the present invention may include a polarization splitter 410, an SSB signal generator 420, and a polarization combiner 430.

The polarization splitter 410 may split unpolarized input light, input from a light source, into two light signals 21 and 22 having polarization characteristics crossing each other. Since the optical modulator according to another embodiment of the present invention includes the polarization splitter 410, it is possible to process low-cost unpolarized input light, and the polarization rotator 320 of FIG. 3 may be omitted. Accordingly, it is possible to design an optical modulator having a simple structure.

The SSB signal generator 420 may optical-modulate the light signal 21 to generate one sideband signal "$\omega_c-\omega_{RF}$", based on an RF signal which is to be transmitted or received.

The SSB signal generator 420 may have the same configuration and function as those of the SSB signal generator 330 of FIG. 3. Therefore, a description of the SSB signal generator 330 of FIG. 3 may be applied to the SSB signal generator 420.

The polarization combiner 430 may combine polarization of the light signal 22 obtained through splitting by the polarization splitter 410 and polarization of the sideband signal "$\omega_c-\omega_{RF}$" input from an optical filter 424 of the SSB signal generator 420. In this case, the light signal 22 may be used as a carrier signal. The polarization combiner 430 may output a light signal which is obtained by combining polarization of a carrier signal and polarization of a sideband signal "$\omega_c-\omega_{RF}$" of an RF signal crossing each other.

The polarization splitter 410, the SSB signal generator 420, and the polarization combiner 430 may be implemented as integrated photonics devices which are embedded into one chip through a silicon or compound-based photonics process.

Figure 5:
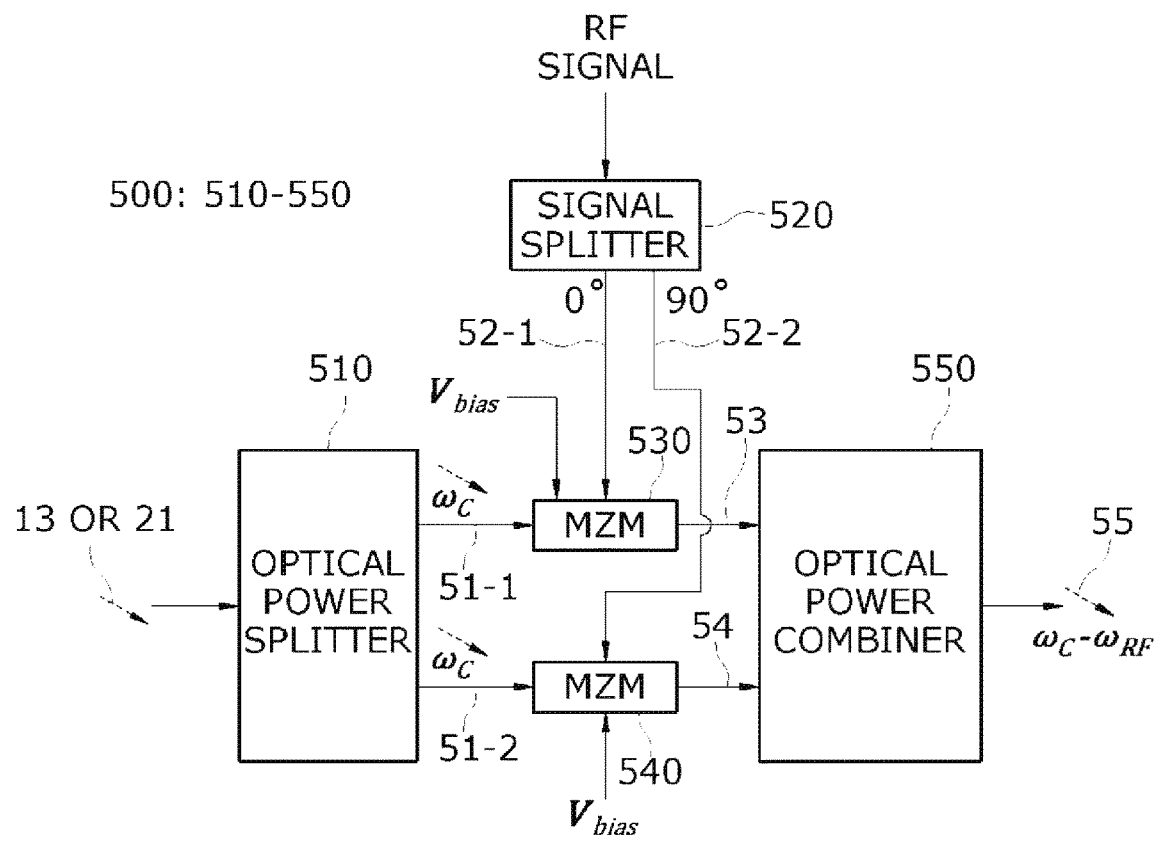
FIG. 5 is a block diagram illustrating an example of a single sideband signal generator illustrated in FIGS. 3 and 4.

FIG. 5 is a block diagram illustrating an example of an SSB signal generator illustrated in FIGS. 3 and 4.

Referring to FIG. 5, an SSB signal generator 500 according to another embodiment of the present invention may include an optical power splitter 510, a signal splitter 520, two MZMs (for example, a first MZM and a second MZM) 530 and 540, and an optical power combiner 550.

The optical power splitter 510 may split one light signal 13 or 21, input from the polarization rotator 320 of FIG. 3 or the polarization splitter 410 of FIG. 4, into two light signals 51-1 and 51-2 which are obtained by splitting power at an arbitrary splitting rate.

The signal splitter 520 may split one RF signal into two RF signals 52-1 and 52-2 having a 90-degree phase difference therebetween. The signal splitter 520 may be implemented with a quadrature hybrid coupler or a branch line hybrid coupler.

When a bias voltage $V_{bias}$ is input, the first MZM 530 may modulate the light signal 51-1, obtained through splitting by the optical power splitter 510, into one sideband signal 53 on the basis of the RF signal 52-1 obtained through splitting by the signal splitter 520.

When the bias voltage $V_{bias}$ is input, the second MZM 540 may modulate the light signal 51-2, obtained through splitting by the optical power splitter 510, into a sideband signal 54 on the basis of the RF signal 52-2 which is obtained through splitting by the signal splitter 520 to have a 90-degree phase difference with the RF signal 52-1.

The optical power combiner 550 may combine power of the sideband signal 53 obtained through modulation by the first MZM 530 and power of the sideband signal obtained through modulation by the second MZM 540 to output one sideband signal "$\omega_c-\omega_{RF}$".

Unlike the SSB signal generator 330 of FIG. 3 and the SSB signal generator 420 of FIG. 4, an optical filter may be omitted in the SSB signal generator 500 according to another embodiment of the present invention. Accordingly, in the SSB signal generator 500 according to another embodiment of the present invention, loss and noise caused by an optical filter may be minimized.

The optical power splitter 510, the signal splitter 520, the two MZMs 530 and 540, and the optical power combiner 550 may be implemented as integrated photonics devices which are embedded into one chip through a silicon or compound-based photonics process.

Figure 6:
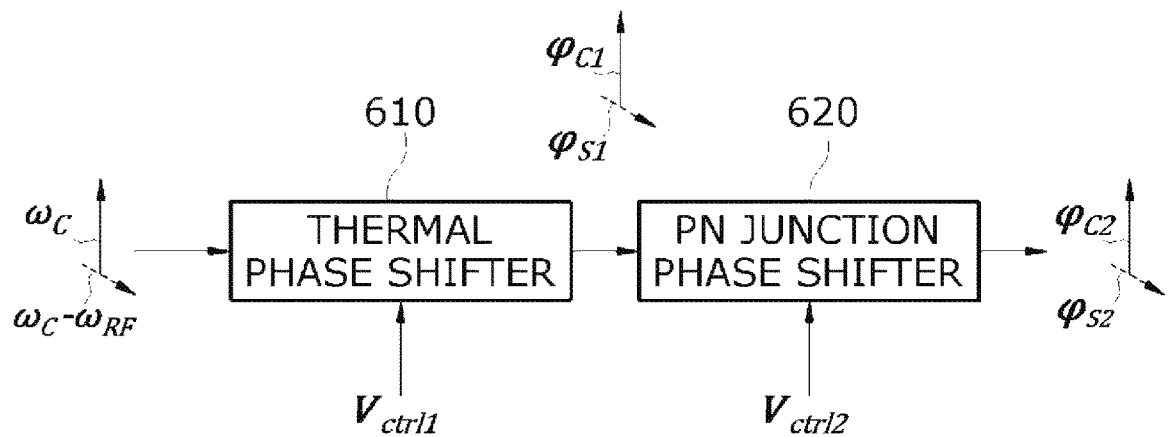
FIG. 6 is a block diagram of a light phase shifter illustrated in FIGS. 1, 2A, and 2B.

FIG. 6 is a block diagram of a light phase shifter illustrated in FIGS. 1, 2A, and 2B.

Referring to FIG. 6, a light phase shifter according to an embodiment of the present invention may include a thermal phase shifter 610 and a PN junction phase shifter 620.

The thermal phase shifter 610 may primarily shift phases of a carrier signal and a sideband signal having polarization characteristics crossing each other, based on a voltage control signal $V_{ctrl1}$ from an external controller (not shown).

The PN junction phase shifter 620 may secondarily shift phases of a carrier signal and a sideband signal having phases obtained through the primary phase shift by the thermal phase shifter 610, based on a voltage control signal $V_{ctrl2}$ from the external controller.

The thermal phase shifter 610 may more quickly control a phase shift than the PN junction phase shifter 620, and the PN junction phase shifter 620 may finely control a phase shift to a desired degree. That is, in the light phase shifter according to an embodiment of the present invention, two kinds of phase shifters may be used, and thus, a phase shift may be quickly and accurately controlled. Also, the optical phase shifter may be implemented to include one kind of phase shifter, based on application.

The thermal phase shifter 610 and the PN junction phase shifter 620 may be implemented as integrated photonics devices which are embedded into one chip through a silicon or compound-based photonics process.

Figure 7A:
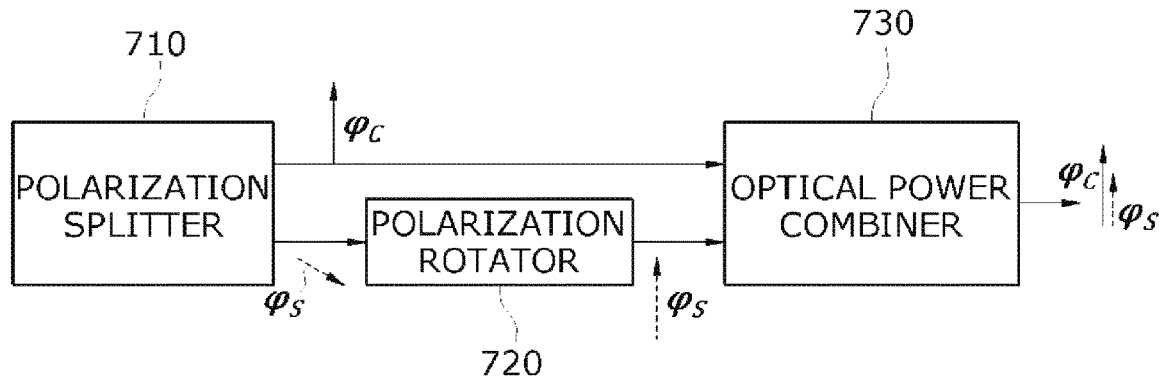
FIG. 7A is a block diagram illustrating an example of a polarization controller illustrated in FIGS. 1, 2A, and 2B.

FIG. 7A is a block diagram illustrating an embodiment of a polarization controller illustrated in FIGS. 1 to 3.

Referring to FIG. 7A, a polarization controller according to an embodiment of the present invention may rotate, by 90 degrees, polarization of one of a carrier signal "$\varphi_c$" and a sideband signal "$\varphi_S$" having phases shifted by a light phase shifter in order for the carrier signal "$\varphi_c$" and the sideband signal "$\varphi_S$" to have the same polarization characteristic. To this end, the polarization controller may include a polarization splitter 710, a polarization rotator 720, and an optical power combiner 730.

The polarization splitter 710 may split the carrier signal "$\varphi_c$" and the sideband signal "$\varphi_S$", based on the polarization characteristic.

The polarization rotator 720 may rotate, by 90 degrees, polarization of one of the carrier signal "$\varphi_c$" and the sideband signal "$\varphi_S$" split by the polarization splitter 710. Therefore, the carrier signal "$\varphi_c$" and the sideband signal "$\varphi_S$" split by the polarization splitter 710 may have the same polarization characteristic. In FIG. 7A, an example where polarization of a sideband signal rotates by 90 degrees is illustrated, but polarization of a carrier signal may rotate by 90 degrees.

The optical power combiner 730 may combine powers of the carrier signal "$\varphi_c$" and the sideband signal "$\varphi_S$" having the same polarization characteristic to generate one light signal.

The light signal generated by the optical power combiner 730 may be input to a corresponding photodetector of the light detection block 150 or 280, and the corresponding photodetector may convert the light signal input thereto into an electrical signal and may transfer the electrical signal to a corresponding antenna element of the phase array antenna 170. The corresponding antenna element may radially transmit the electrical signal in an RF signal form, or the electrical signal may be transferred to and demodulated by the signal processor 102 illustrated in FIGS. 2 and 3.

Figure 7B:
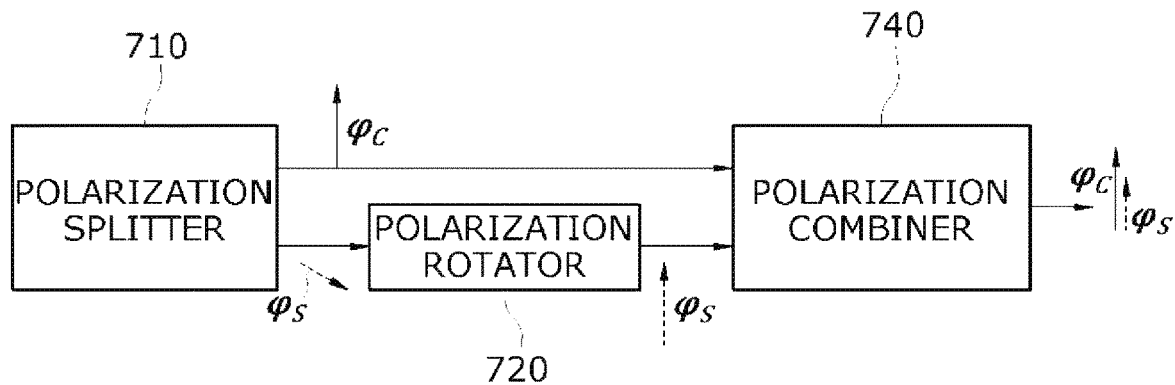
FIG. 7B is a block diagram illustrating another example of a polarization controller illustrated in FIGS. 1, 2A, and 2B.

FIG. 7B is a block diagram illustrating another example of a polarization controller illustrated in FIGS. 1, 2A, and 2B.

Referring to FIG. 7B, a polarization controller according to another embodiment of the present invention may include a polarization splitter 710, a polarization rotator 720, and a polarization combiner 740. Except for that the optical power combiner 730 of FIG. 7A is replaced with the polarization combiner 740, the polarization controller according to another embodiment of the present invention may have the same configuration and function as the polarization controller of FIG. 7A.

The polarization combiner 740 included in the polarization controller according to another embodiment of the present invention may combine powers of a carrier signal "$\varphi_c$" and a sideband signal "$\varphi_S$" having the same polarization characteristic to generate one light signal.

The polarization controller including the polarization splitter 710, the polarization rotator 720, and the optical power combiner 730 and the polarization controller including the polarization splitter 710, the polarization rotator 720, and the polarization combiner 740 may be implemented as integrated photonics devices which are embedded into one chip through a silicon or compound-based photonics process.

Figure 8:
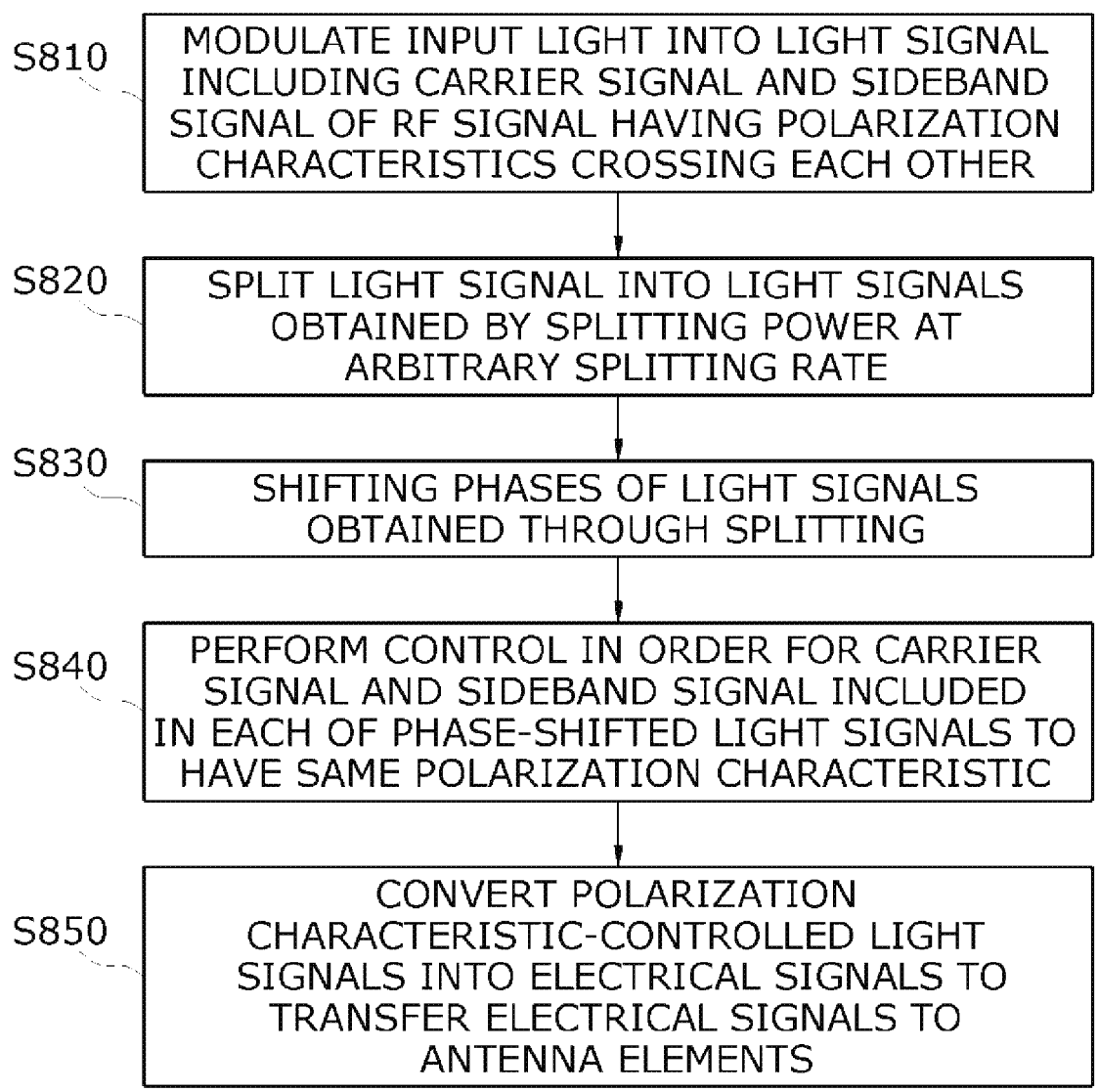
FIG. 8 is a flowchart illustrating a transmitting method in a beamforming apparatus according to an embodiment of the present invention.

FIG. 8 is a flowchart illustrating a transmitting method in a beamforming apparatus according to an embodiment of the present invention.

Referring to FIG. 8, in step S810, a process of modulating, by an optical modulator, polarized or unpolarized input light from a light source into a light signal including a carrier signal and a sideband signal of an RF signal having polarization characteristics crossing each other may be performed.

Subsequently, in step S820, a process of splitting, by an optical power splitter, the light signal obtained through modulation by the optical modulator into a plurality of light signals obtained by splitting power at an arbitrary splitting rate may be performed.

Subsequently, in step S830, a process of respectively shifting, by a plurality of light phase shifters, phases of the plurality of light signals obtained through splitting by the optical power splitter may be performed.

Subsequently, in step S840, a process of performing control, by a plurality of polarization controllers, in order for a carrier signal and a sideband signal included in each of the phase-shifted plurality of light signals to have the same polarization characteristic may be performed.

Subsequently, in step S850, a process of converting, by a plurality of photodetectors, the polarization characteristic-controlled plurality of light signals into a plurality of electrical signals to transfer the plurality of electrical signals to a plurality of antenna elements may be performed.

Figure 9:
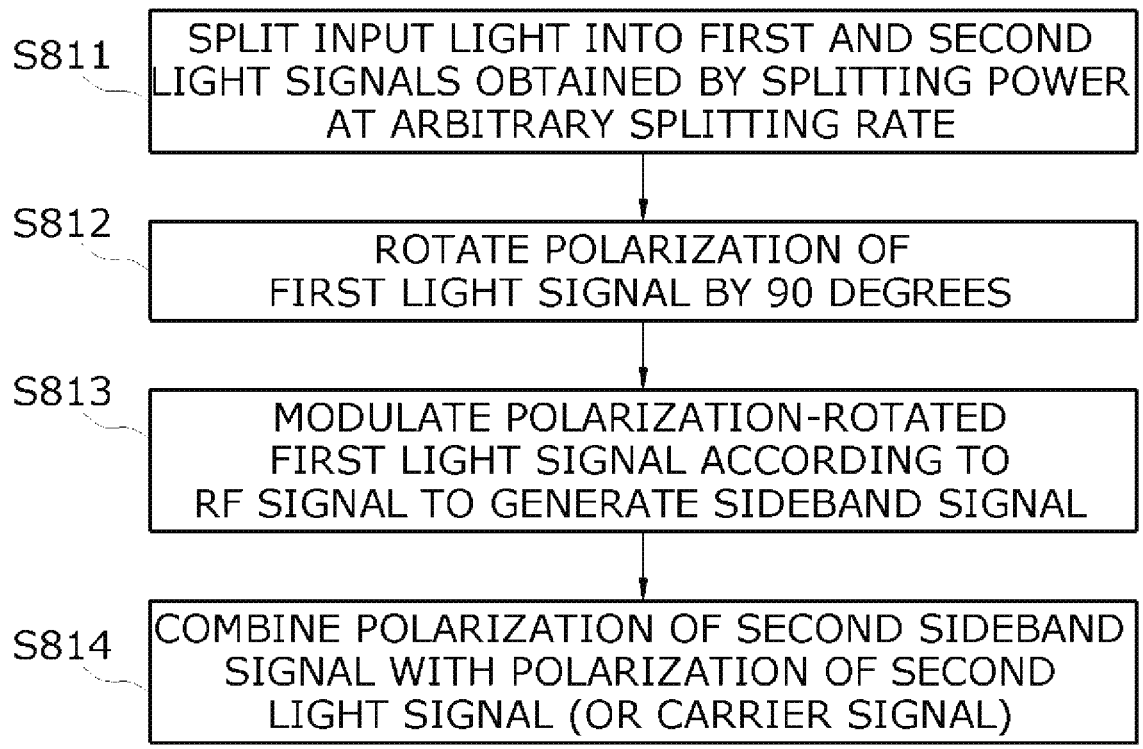
FIG. 9 is a flowchart illustrating a detailed process of step S810 illustrated in FIG. 8.

FIG. 9 is a flowchart illustrating a detailed process of step S810 illustrated in FIG. 8.

Referring to FIG. 9, in step S811, a process of splitting, by the optical power splitter 310, the polarized input light into the first light signal 11 and the second light signal 12 (the carrier signal) each obtained by splitting power at an arbitrary splitting rate may be performed.

Subsequently, in step S812, a process of rotating, by the polarization rotator 320, polarization of the first light signal 11 by 90 degrees with respect to the second light signal 12 (the carrier signal) may be performed.

Subsequently, in step S813, a process of modulating, by the SSB signal generator 330, the first light signal 13 having the 90-degree-rotated polarization according to the RF signal to generate the sideband signal "$\omega_c-\omega_{RF}$" may be performed.

The process of step S813, for example, may include a process of modulating, by the MZM 332, the polarization-rotated first light signal 13 according to the RF signal to output a DSB signal including two sideband signals "$\omega_c+\omega_{RF}$" and "$\omega_c-\omega_{RF}$" appearing in a left side and a right side with respect to a carrier frequency of the carrier signal and a process of filtering, by the optical filter 334, the DSB signal to output only one sideband signal "$\omega_c-\omega_{RF}$".

As another example, the process of step S813 may include a process of splitting, by the optical power splitter 510, the polarization-rotated first light signal 13 into the two light signals 51-1 and 51-2 obtained by splitting power at an arbitrary splitting rate, a process of splitting, by the signal splitter 520, the RF signal into the first RF signal 52-1 and the second RF signal 52-2 having a 90-degree phase difference therebetween, a process of modulating, by the MZM 530, the light signal 51-1 of the two light signals 51-1 and 51-2 according to the first RF signal 52-1 to output the first sideband signal, a process of modulating, by the MZM 530, the light signal 51-2 of the two light signals 51-1 and 51-2 according to the second RF signal 52-2 to output the second sideband signal, and a process of combining, by the optical power combiner 550, power of the first sideband signal 53 with power of the second sideband signal 54.

Subsequently, in step S814, a process of combining, by the polarization combiner 340, polarization of the second sideband signal "$\omega_c-\omega_{RF}$" with polarization of the second light signal 12 (the carrier signal).

Figure 10:
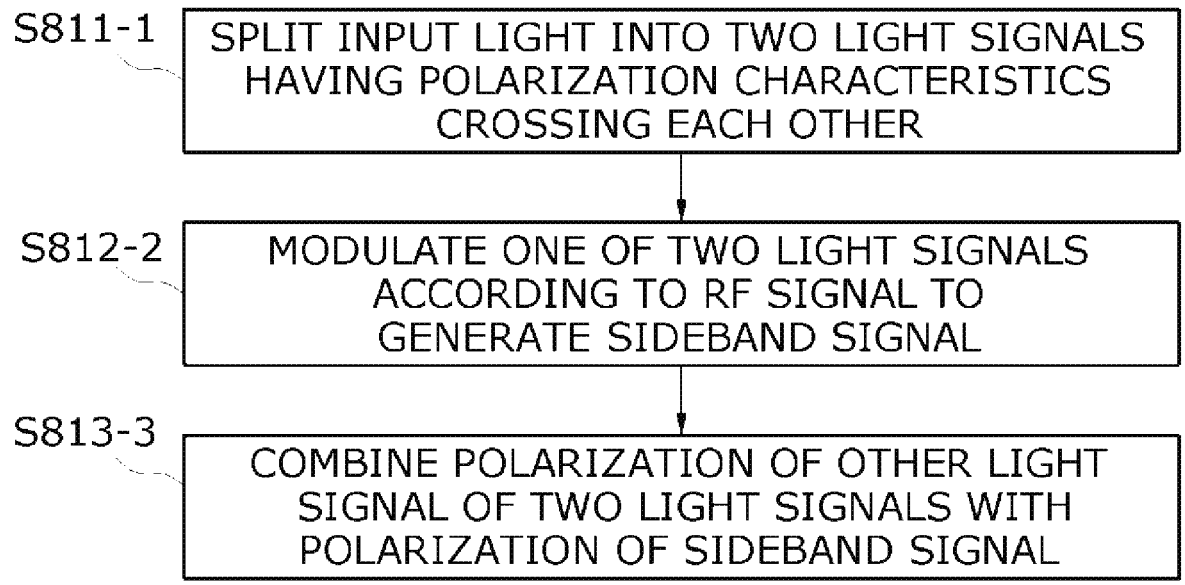
FIG. 10 is a flowchart illustrating another detailed process of step S810 illustrated in FIG. 8.

FIG. 10 is a flowchart illustrating another detailed process of step S810 illustrated in FIG. 8.

Referring to FIG. 10, in step S811-1, a process of splitting, by the polarization splitter 410, the unpolarized input light into two light signals having polarization characteristics crossing each other may be performed.

Subsequently, in step S812-2, a process of modulating, by the SSB signal generator 420, the light signal 21 of the two light signals 21 and 22 according to the RF signal to generate the sideband signal may be performed.

Subsequently, in step S813-3, a process of combining, by the polarization combiner 430, polarization of the generated sideband signal with polarization of the light signal 22 (the carrier signal) of the two light signals 21 and 22 may be performed.

Figure 11:
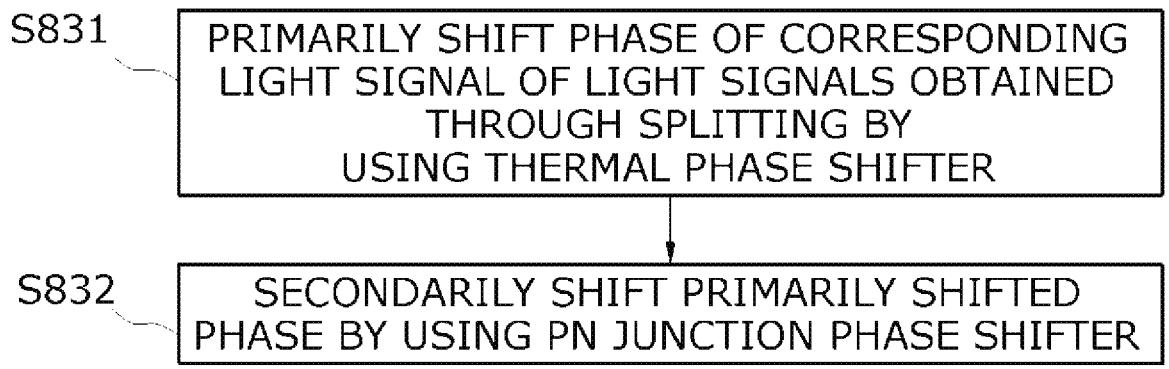
FIG. 11 is a flowchart illustrating a detailed process of step S830 illustrated in FIG. 8.

FIG. 11 is a flowchart illustrating a detailed process of step S830 illustrated in FIG. 8.

Referring to FIG. 11, in step S831, a process of primarily shifting, by each of a plurality of light phase shifters, a phase of a corresponding light signal of a plurality of light signals obtained through splitting by the optical power splitter 120 by using the thermal phase shifter 610 may be performed.

Subsequently in step S832, a process of secondarily shifting, by each of the plurality of light phase shifters, the primarily shifted phase by using the PN junction phase shifter 620 may be performed.

As another example, the process of step S830 may include one of a primary phase shift process performed by the thermal phase shifter 610 and a secondary phase shift process performed by the PN junction phase shifter 620.

Figure 12:
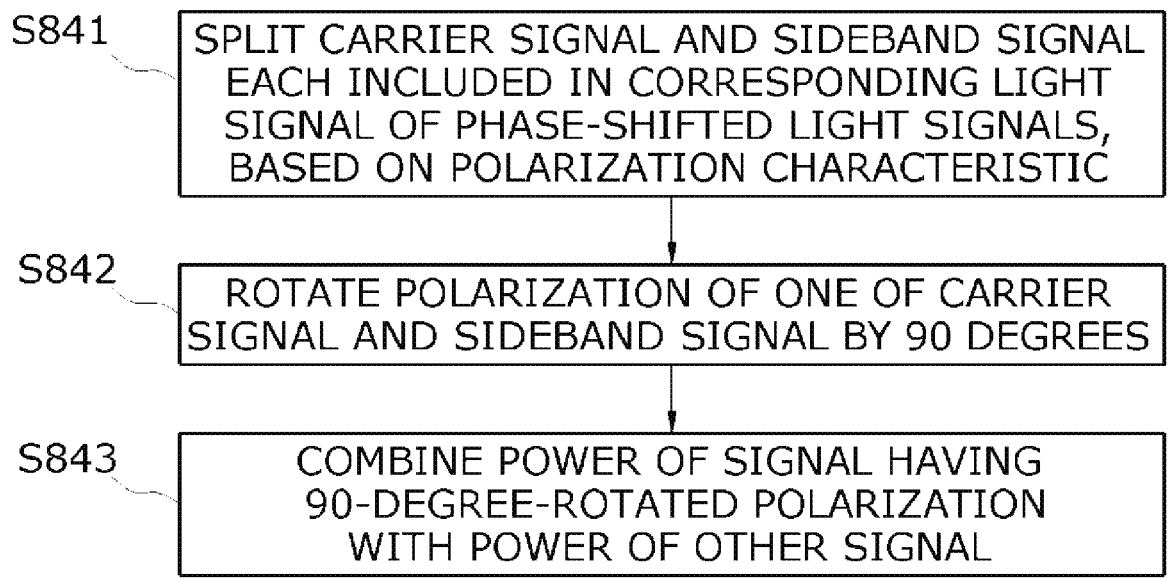
FIG. 12 is a flowchart illustrating a detailed process of step S840 illustrated in FIG. 8.

FIG. 12 is a flowchart illustrating a detailed process of step S840 illustrated in FIG. 8.

Referring to FIG. 12, in step S841, a process of splitting, by the polarization splitter 710, the carrier signal and the sideband signal each included in a corresponding light signal of the phase-shifted plurality of light signals on the basis of polarization characteristic may be performed.

Subsequently, in step S842, a process of rotating, by the polarization rotator 720, polarization of one of the carrier signal and the sideband signal by 90 degrees may be performed.

Subsequently, in step S843, a process of combining, by the optical power combiner 730 (see FIG. 7A), power of a signal having the 90-degree-rotated polarization with power of the other signal may be performed. As another example, in step S843, a process of combining, by the optical power combiner 740 (see FIG. 7B), the power of the signal having the 90-degree-rotated polarization with the power of the other signal may be performed.

As described above, according to the embodiments of the present invention, the polarization controller may split a phase-shifted light signal into two polarization signals (a carrier signal "$\omega_c$" and a sideband signal "$\varphi_S$") by using the polarization splitter, rotate one of the two polarization signals by the polarization rotator, and combine the rotated signal with the other signal by using the polarization combiner. That is, by using optical elements such as the polarization splitter, the polarization rotator, and the polarization combiner, signal loss may be minimized in a light signal splitting, a light signal rotating process, and a light signal combining process.

Moreover, according to the embodiments of the present invention, since a phase shift value of each channel is determined based on a phase difference of a signal controlled by the optical phase shifter, a desired constant phase value may be controlled regardless of a carrier frequency.

Moreover, according to the embodiments of the present invention, since the optical phase shifter is configured by a combination of two kinds of phase shifters, phase control may be quickly and accurately performed.

Moreover, according to the embodiments of the present invention, since all elements are implemented as elements which are capable of being manufactured in a wafer level through a silicon or compound-based photonics process, an apparatus may be miniaturized and may be produced in large quantity, and all elements may be integrated into one chip.

Moreover, according to the embodiments of the present invention, all elements may be integrated into one chip, and thus, the phase array antenna including thousands of antennas may be implemented without a limitation in performance and a physical limitation. Accordingly, the phase array antenna may be applied to 5G massive beamforming and a next-generation high performance radar having a multi-beam transmission/reception function.

FIG. 13 is a flowchart illustrating a receiving method in a beamforming apparatus according to an embodiment of the present invention.

Referring to FIG. 13, the receiving method according to an embodiment of the present invention may be a receiving method of the receiving apparatus illustrated in FIG. 2A. First, in step S1310, a process of receiving, by the plurality of antenna elements AE-1 to AE-n included in the phase array antenna 210, a plurality of RF signals may be performed.

Subsequently, in step S1320, a process of amplifying, by each low noise amplifier of the amplifier block 220, an RF signal received from a corresponding antenna element may be performed.

Subsequently, in step S1330, a process of splitting, by the optical power splitter 240, polarized or unpolarized input light input from the light source module 230 into a plurality of channels according to an arbitrary power splitting rate may be performed.

Subsequently, in step S1340, a process of modulating, by each of the optical modulators OM-1 to OM-n of the optical modulator block 250 may modulate corresponding input light output from the optical power splitter 240 into a light signal according to a corresponding RF signal output from a corresponding low noise amplifier of the low noise amplifiers LNA-1 to LNA-n. That is, each of the optical modulators OM-1 to OM-n may modulate input light into a light signal including a carrier signal and a sideband signal of the RF signal according to the RF signal output from a corresponding low noise amplifier, based on the bias voltage $V_{bias}$.

Subsequently, in step S1350, a process of shifting, by each of the plurality of light phase shifters PS-1 to PS-n included in the light phase shift block 260, a phase of a modulated light signal received from a corresponding optical modulator may be performed. Each of the light phase shifters PS-1 to PS-n may shift a phase of a carrier signal, included in the light signal, to a specific phase "$\varphi_c$" on the basis of a phase shift rate which is differently set for each channel, and may shift a phase of the sideband signal of the RF signal to the specific phase "$\varphi_S$".

Subsequently, in step S1360, a process of performing, by each polarization controller of the polarization control block 270, control in order for the phase-shifted carrier signal "$\varphi_c$" and the phase-shifted sideband signal "$\varphi_S$" to have the same polarization characteristic may be performed.

Subsequently, in step S1370, a process of converting, by each polarization controller of the polarization control block 270, a light signal, including a carrier signal "$\varphi_c$" and a sideband signal "$\varphi_S$" controlled by a corresponding polarization controller to have the same polarization characteristic, into an electrical signal may be performed.

Subsequently, in step S1380, a process of demodulating, by the signal processor 102, a plurality of electrical signals obtained through modulation by the light detection block 280 may be performed.

FIG. 14 is a flowchart illustrating a receiving method in a receiving apparatus according to another embodiment of the present invention.

Referring to FIG. 14, steps S1410 to S1460 may be respectively the same as steps S1310 to S1360 illustrated in FIG. 13. Therefore, descriptions of steps S1310 to S1360 may be applied to steps S1410 to S1460. Hereinafter, steps S1470 and S1480 performed after step S1460 will be described.

In step S1470, a process of combining, by the optical power combiner 282, powers of a plurality of light signals each including a carrier signal and a sideband signal having the same polarization characteristic to generate one light signal may be performed.

Subsequently, in step S1480, a process of converting, by one photodetector 284, the one light signal generated by the optical power combiner 282 into one electrical signal to output the electrical signal to the signal processor 102 may be performed.

Subsequently, in step S1490, a process of demodulating, by the signal processor 102, the one electrical signal may be performed.

In the receiving method according to the embodiment of FIG. 13, a plurality of photodetectors may respectively convert a plurality of light signals output from a plurality of polarization controllers into a plurality of electrical signals, and the signal processor 102 may demodulate the plurality of electrical signals.

On the other hand, in the receiving method according to the embodiment of FIG. 14, since the optical power combiner 282 combines powers of a plurality of light signals output from a plurality of polarization controllers to generate one light signal, a process of converting a light signal into an electrical signal may use only one photodetector instead of a plurality of photodetectors. Accordingly, in comparison with the embodiment of FIG. 13, the number of photodetectors may be considerably reduced in the embodiment of FIG. 14.

Moreover, in the receiving method according to the embodiment of FIG. 14, since the signal processor 102 demodulates only one electrical signal without demodulating a plurality of electrical signals, a processing time may be considerably reduced in a signal demodulating process.

As described above, according to the embodiments of the present invention, since a phase shift value of each channel is determined based on a phase difference of a signal controlled by the optical phase shifter, a desired constant phase value may be controlled regardless of the frequency of the RF signal, and thus, a beam steering angle may be continuously controlled.

Moreover, according to the embodiments of the present invention, since each of the transmitting apparatus and the receiving apparatus includes the polarization controller, loss may decrease in a process where each of the optical power splitter and the polarization rotator processes a general light source having no polarization characteristic, in addition to a light source having one polarization characteristic, and a structure may be simple.

Moreover, according to the embodiments of the present invention, since the optical phase shifter is configured by a combination of two kinds of phase shifters, phase control may be quickly and accurately performed.

Moreover, according to the embodiments of the present invention, by using the polarizer controller, one polarization may be split into two polarizations without loss, and the two polarizations may be rotated and combined, thereby minimizing loss and enabling an operation to be performed in a wideband frequency.

Moreover, according to the embodiments of the present invention, since all elements are implemented as elements which are capable of being manufactured in a wafer level through a silicon or compound-based photonics process, an apparatus may be miniaturized and may be produced in large quantity, and all elements may be integrated into one chip.

Moreover, according to the embodiments of the present invention, all elements may be integrated into one chip, and thus, the phase array antenna including thousands of antennas may be implemented without a limitation in performance and a physical limitation. Accordingly, the phase array antenna may be applied to 5G massive beamforming and a next-generation high performance radar having a multi-beam transmission/reception function.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A transmitting apparatus for beamforming communication, including elements manufactured in a wafer level through a silicon or compound-based photonics process, the transmitting apparatus comprising:
   an optical modulator configured to modulate polarized or unpolarized input light into a light signal including a carrier signal and a sideband signal based on a radio frequency (RF) signal, having polarization characteristics crossing each other;
   an optical power splitter configured to split the light signal into a plurality of light signals obtained by splitting power at an arbitrary splitting rate;
   a plurality of light phase shifters configured to respectively shift phases of the plurality of light signals;
   a plurality of polarization controllers configured to perform control so that a phase-shifted carrier signal and a phase-shifted sideband signal included in each of the phase-shifted plurality of light signals have the same polarization characteristic;
   a plurality of photodetectors configured to convert the plurality of light signals, each including the phase-shifted carrier signal and the phase-shifted sideband signal which are controlled to have the same polarization characteristic, into a plurality of electrical signals; and
   a plurality of antenna elements configured to radially transmit the plurality of electrical signals in an RF signal form, respectively.

2. The transmitting apparatus of claim 1, wherein the optical modulator comprises:
   an optical power splitter configured to split the polarized input light into a first light signal and a second light signal (hereinafter referred to as a carrier signal) each obtained by splitting power at an arbitrary splitting rate;
   a polarization rotator configured to rotate polarization of the first light signal by 90 degrees with respect to polarization of the carrier signal;
   a single sideband (SSB) signal generator configured to modulate the polarization-rotated first light signal according to the RF signal to generate the sideband signal; and
   a polarization combiner configured to combine polarization of the sideband signal with the polarization of the carrier signal.

3. The transmitting apparatus of claim 2, wherein the SSB signal generator comprises:
  a Mach-Zander modulator (MZM) configured to modulate the polarization-rotated first light signal according to the RF signal to output two sideband signals appearing in a left side and a right side with respect to a carrier frequency of the carrier signal; and
  an optical filter configured to output one sideband signal selected from among the two sideband signals.

4. The transmitting apparatus of claim 2, wherein the SSB signal generator comprises:
  an optical power splitter configured to split the polarization-rotated first light signal into two light signals obtained by splitting power at an arbitrary splitting rate;
  a signal splitter configured to split the RF signal into a first RF signal and a second RF signal having a 90-degree phase difference therebetween;
  a first Mach-Zander modulator (MZM) configured to modulate one of the two light signals according to the first RF signal to output a first sideband signal;
  a second MZM configured to modulate the other light signal of the two light signals according to the second RF signal to output a second sideband signal; and
  an optical power combiner configured to combine power of the first sideband signal with power of the second sideband signal to output the sideband signal.

5. The transmitting apparatus of claim 1, wherein the optical modulator comprises:
  a polarization splitter configured to split the unpolarized input light into a first light signal and a second light signal (hereinafter referred to as a carrier signal) respectively having polarization characteristics crossing each other;
  a single sideband (SSB) signal generator configured to optical-modulate the first light signal according to the RF signal to generate the sideband signal; and
  a polarization combiner configured to combine polarization of the sideband signal with polarization of the carrier signal.

6. The transmitting apparatus of claim 1, wherein each of the plurality of light phase shifters comprises at least one of a thermal phase shifter configured to primarily shift a phase of a corresponding light signal of a plurality of light signals obtained through splitting by the optical power splitter and a PN junction phase shifter configured to secondarily shift the primarily shifted phase.

7. The transmitting apparatus of claim 1, wherein each of the plurality of polarization controllers comprises:
  a polarization splitter configured to split the carrier signal and the sideband signal each included in the light signal input from a corresponding light phase shifter of the plurality of light phase shifters, based on polarization characteristic;
  a polarization rotator configured to rotate polarization of one of the carrier signal and the sideband signal by 90 degrees; and
  an optical power combiner configured to combine power of a signal having the 90-degree-rotated polarization with power of another signal to output a light signal including a phase-shifted carrier signal and a phase-shifted sideband signal having the same polarization characteristic.

8. The transmitting apparatus of claim 1, wherein each of the plurality of polarization controllers comprises:
  a polarization splitter configured to split the carrier signal and the sideband signal each included in the light signal input from a corresponding light phase shifter of the plurality of light phase shifters, based on polarization characteristic;
  a polarization rotator configured to rotate polarization of one of the carrier signal and the sideband signal by 90 degrees; and
  a polarization combiner configured to combine polarization of a signal having the 90-degree-rotated polarization with polarization of another signal to output a light signal including a phase-shifted carrier signal and a phase-shifted sideband signal having the same polarization characteristic.

9. A receiving apparatus for beamforming communication, the receiving apparatus comprising:
  an optical power splitter configured to split polarized or unpolarized input light into a plurality of polarized or unpolarized input lights each obtained by splitting power at an arbitrary splitting rate;
  a plurality of optical modulators respectively connected to a plurality of antenna elements and configured to modulate corresponding input light of the plurality of polarized or unpolarized input lights into a light signal including a carrier signal and a sideband signal based on a radio frequency (RF) signal received through a corresponding antenna element of the plurality of antenna elements, the carrier signal and the sideband signal having polarization characteristics crossing each other;
  a plurality of light phase shifters configured to respectively shift phases of a plurality of modulated light signals;
  a plurality of polarization controllers configured to perform control so that a carrier signal and a sideband signal included in each of a plurality of phase-shifted light signals have the same polarization characteristic;
  a plurality of photodetectors configured to convert a plurality of light signals, having polarization characteristics controlled by the plurality of polarization controllers, into a plurality of electrical signals; and
  a signal processor configured to demodulate the plurality of electrical signals.

10. The receiving apparatus of claim 9, wherein each of the plurality of optical modulators comprises:
  an optical power splitter configured to split corresponding input light of the plurality of polarized input lights into a first light signal and a second light signal (hereinafter referred to as a carrier signal) each obtained by splitting power at an arbitrary splitting rate;
  a polarization rotator configured to rotate polarization of the first light signal by 90 degrees with respect to polarization of the carrier signal;
  a single sideband (SSB) signal generator configured to modulate the polarization-rotated first light signal according to the RF signal to generate the sideband signal; and
  a polarization combiner configured to combine polarization of the generated sideband signal with the polarization of the carrier signal.

11. The receiving apparatus of claim 9, wherein each of the plurality of optical modulators comprises:
  a polarization splitter configured to split corresponding input light of the plurality of unpolarized input lights into a first light signal and a second light signal (hereinafter referred to as a carrier signal) respectively having polarization characteristics crossing each other;

a single sideband (SSB) signal generator configured to optical-modulate the first light signal according to the RF signal to generate the sideband signal; and a polarization combiner configured to combine polarization of the sideband signal with polarization of the carrier signal.

12. The receiving apparatus of claim 9, wherein each of the plurality of light phase shifters comprises at least one of a thermal phase shifter configured to primarily shift a phase of a corresponding light signal of a plurality of light signals obtained through splitting by the optical power splitter and a PN junction phase shifter configured to secondarily shift the primarily shifted phase.

13. The receiving apparatus of claim 9, wherein each of the plurality of polarization controllers comprises:

a polarization splitter configured to split the carrier signal and the sideband signal each included in the light signal input from a corresponding light phase shifter of the plurality of light phase shifters, based on polarization characteristic;

a polarization rotator configured to rotate polarization of one of the carrier signal and the sideband signal by 90 degrees; and an optical power combiner configured to combine power of a signal having the 90-degree-rotated polarization with power of another signal to output a light signal including a phase-shifted carrier signal and a phase-shifted sideband signal having the same polarization characteristic.

14. A transmitting method for beamforming communication, the transmitting method comprising:

modulating, by an optical modulator, polarized or unpolarized input light into a light signal including a carrier signal and a sideband signal based on a radio frequency (RF) signal, having polarization characteristics crossing each other;

splitting, by an optical power splitter, the light signal into a plurality of light signals;

respectively shifting, by a plurality of light phase shifters, phases of the plurality of light signals;

performing, by a plurality of polarization controllers, control so that a phase-shifted carrier signal and a phase-shifted sideband signal included in each of the plurality of light signals have the same polarization characteristic;

converting, by a plurality of photodetectors, the plurality of light signals, each including the phase-shifted carrier signal and the phase-shifted sideband signal which are controlled to have the same polarization characteristic, into a plurality of electrical signals; and radially transmitting, by a plurality of antenna elements, the plurality of electrical signals in an RF signal form.

15. The transmitting method of claim 14, wherein the modulating comprises:

splitting, by an optical power splitter included in the optical modulator, the polarized input light into a first light signal and a second light signal (hereinafter referred to as a carrier signal) each obtained by splitting power at an arbitrary splitting rate;

rotating, by a polarization rotator included in the optical modulator, polarization of the first light signal by 90 degrees with respect to polarization of the carrier signal;

modulating, by a single sideband (SSB) signal generator included in the optical modulator, the polarization-rotated first light signal according to the RF signal to generate the sideband signal; and combining polarization of the sideband signal with the polarization of the carrier signal.

16. The transmitting method of claim 15, wherein the generating of the sideband signal comprises:

modulating, by a Mach-Zander modulator (MZM) included in the SSB signal generator, the polarization-rotated first light signal according to the RF signal to output two sideband signals appearing in a left side and a right side with respect to a carrier frequency of the carrier signal; and outputting, by an optical filter included in the SSB signal generator, one sideband signal selected from among the two sideband signals.

17. The transmitting method of claim 15, wherein the generating of the sideband signal comprises:

splitting, by an optical power splitter included in the SSB signal generator, the polarization-rotated first light signal into two light signals obtained by splitting power at an arbitrary splitting rate;

splitting, by a signal splitter included in the SSB signal generator, the RF signal into a first RF signal and a second RF signal having a 90-degree phase difference therebetween;

modulating, by a first Mach-Zander modulator (MZM) included in the SSB signal generator, one of the two light signals according to the first RF signal to output a first sideband signal;

modulating, by a second MZM included in the SSB signal generator, the other light signal of the two light signals according to the second RF signal to output a second sideband signal; and combining, by an optical power combiner included in the SSB signal generator, power of the first sideband signal with power of the second sideband signal to output the sideband signal.

18. The transmitting method of claim 14, wherein the modulating comprises:

splitting, by a polarization splitter included in the optical modulator, the unpolarized input light into a first light signal and a second light signal (hereinafter referred to as a carrier signal) respectively having polarization characteristics crossing each other;

optical-modulating, by a single sideband (SSB) signal generator included in the optical modulator, the first light signal according to the RF signal to generate the sideband signal; and combining, by a polarization combiner included in the optical modulator, polarization of the sideband signal with polarization of the carrier signal.

19. The transmitting method of claim 14, wherein shifting comprises:

primarily shifting, by a thermal phase shifter, a phase of a corresponding light signal of the plurality of light signals obtained through splitting; and secondarily shifting, by a PN junction phase shifter, the primarily shifted phase.

20. The transmitting method of claim 14, wherein the controlling comprises:

splitting, by a polarization splitter included in each of the plurality of polarization controllers, the carrier signal and the sideband signal each included in a corresponding light signal of the plurality of phase-shifted light signals, based on polarization characteristic;

rotating, by a polarization rotator included in each of the plurality of polarization controllers, polarization of one of the carrier signal and the sideband signal by 90 degrees; and combining, by a polarization combiner included in each of the plurality of polarization controllers, polarization of a signal having the 90-degree-rotated polarization with polarization of another signal.

\* \* \* \* \*